(12) United States Patent
Watanabe et al.

(10) Patent No.: US 10,801,835 B2
(45) Date of Patent: Oct. 13, 2020

(54) METHOD FOR INSPECTING END FACE AND DEVICE FOR INSPECTING END FACE, OF HONEYCOMB STRUCTURE

(71) Applicant: NGK INSULATORS, LTD., Nagoya (JP)

(72) Inventors: Ayumi Watanabe, Nagoya (JP); Akihiro Mizutani, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 176 days.

(21) Appl. No.: 15/956,928

(22) Filed: Apr. 19, 2018

(65) Prior Publication Data

US 2018/0238683 A1  Aug. 23, 2018

Related U.S. Application Data

(63) Continuation of application No. PCT/JP2016/081761, filed on Oct. 26, 2016.

(30) Foreign Application Priority Data

Oct. 28, 2015 (JP) ................... 2015-212375

(51) Int. Cl.
*G01B 11/30* (2006.01)
*G01N 21/956* (2006.01)
*G06T 7/00* (2017.01)

(52) U.S. Cl.
CPC ..... *G01B 11/303* (2013.01); *G01N 21/95692* (2013.01); *G06T 7/001* (2013.01); *G06T 7/0008* (2013.01); *G06T 2207/10152* (2013.01)

(58) Field of Classification Search
CPC ............ G01B 11/303; G01N 21/95692; G06T 7/001; G06T 7/0008; G06T 2207/10152

(Continued)

(56) References Cited

U.S. PATENT DOCUMENTS

| 7,283,224 B1 | 10/2007 | Smithgall | |
|---|---|---|---|
| 2009/0010523 A1* | 1/2009 | Komaki | G01N 21/952 |
| | | | 382/141 |
| 2019/0019589 A1* | 1/2019 | Waite | G21C 17/017 |

FOREIGN PATENT DOCUMENTS

| EP | 2 216 643 A1 | 8/2010 |
|---|---|---|
| EP | 3 088 874 A1 | 11/2016 |

(Continued)

OTHER PUBLICATIONS

International Search Report and Written Opinion (Application No. PCT/JP2016/081761) dated Jan. 24, 2017.

*Primary Examiner* — Amandeep Saini
(74) *Attorney, Agent, or Firm* — Burr & Brown, PLLC

(57) ABSTRACT

A method for inspecting an end face, comprising: an arrangement step of arranging a honeycomb structure having a partition wall extending from a first end face to a second end face, at a predetermined position using the second end face as a placement face; a first image data for processing acquisition step of acquiring first image data for processing while irradiating the first end face with light having an angle of 40° or more, the angle being an angle formed between the light and an axis being perpendicular to the placement face of the honeycomb structure; a second image data for processing acquisition step of acquiring second image data for processing while irradiating the first end face with light having an angle of less than 40°; and a crack detection step of detecting a crack by comparing the first image data for processing with the second image data for processing.

7 Claims, 13 Drawing Sheets

(58) Field of Classification Search
USPC .......................................................... 382/141
See application file for complete search history.

(56) References Cited

FOREIGN PATENT DOCUMENTS

| | | |
|---|---|---|
| JP | 2002-257736 A1 | 9/2002 |
| JP | 2006-105816 A1 | 4/2006 |
| JP | 2007-313741 A1 | 12/2007 |
| JP | 2012-103187 A1 | 5/2012 |
| JP | 2013-024560 A1 | 2/2013 |
| JP | 2014-163694 A1 | 9/2014 |
| JP | 2015-014582 A1 | 1/2015 |
| JP | 2015-125089 A1 | 7/2015 |
| WO | 2007/105825 A1 | 9/2007 |
| WO | 2009/069377 A1 | 6/2009 |
| WO | WO-2012117942 A1 * | 9/2012 .............. G01M 3/20 |

* cited by examiner

FIG. 9

| ANGLE OF ILLUMINATION: 70° | ANGLE OF ILLUMINATION: 50° | ANGLE OF ILLUMINATION: 30° | ANGLE OF ILLUMINATION: 10° |
|---|---|---|---|
| 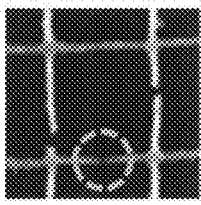 | 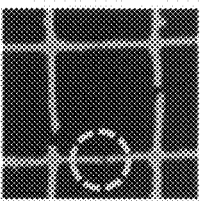 | 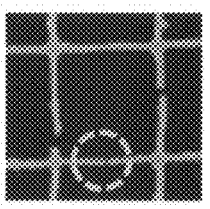 | 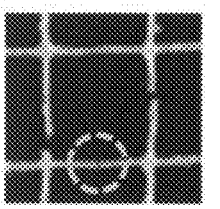 |
| LUMINANCE DIFFERENCE: 93 | LUMINANCE DIFFERENCE: 73 | LUMINANCE DIFFERENCE: 61 | LUMINANCE DIFFERENCE: 49 |

FIG. 10

| ANGLE OF ILLUMINATION: 70° | ANGLE OF ILLUMINATION: 50° | ANGLE OF ILLUMINATION: 30° | ANGLE OF ILLUMINATION: 10° |
|---|---|---|---|
| 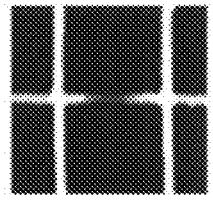 | 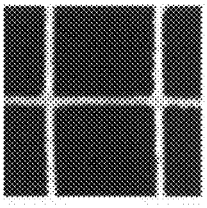 | 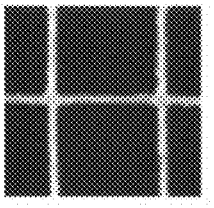 | 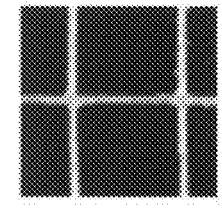 |
| LUMINANCE DIFFERENCE: 112 | LUMINANCE DIFFERENCE: 33 | LUMINANCE DIFFERENCE: 0 | LUMINANCE DIFFERENCE: 0 |

FIG. 11

| ANGLE OF ILLUMINATION: 70° | ANGLE OF ILLUMINATION: 50° | ANGLE OF ILLUMINATION: 30° | ANGLE OF ILLUMINATION: 10° |
|---|---|---|---|
| 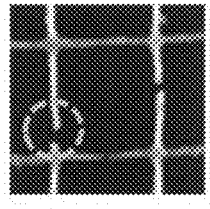 | 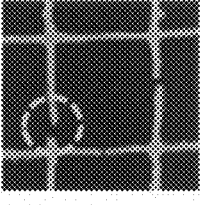 | 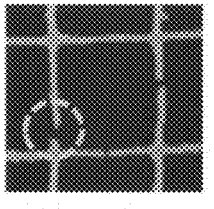 | 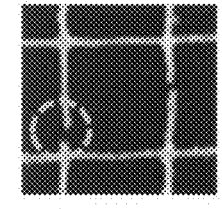 |
| LUMINANCE DIFFERENCE: 120 | LUMINANCE DIFFERENCE: 120 | LUMINANCE DIFFERENCE: 120 | LUMINANCE DIFFERENCE: 120 |

METHOD FOR INSPECTING END FACE AND DEVICE FOR INSPECTING END FACE, OF HONEYCOMB STRUCTURE

BACKGROUND OF THE INVENTION

1. Field of the Invention

The present invention relates to a method for inspecting an end face of a honeycomb structure, and a device for inspecting an end face of a honeycomb structure. More specifically, the present invention relates to a method for inspecting an end face of a honeycomb structure, and a device for inspecting an end face of a honeycomb structure, which are able to detect a crack in a partition wall at an end face of a honeycomb structure.

2. Description of Related Art

In various fields such as chemistry, electric power, and iron and steel, a honeycomb structure made of ceramic is employed as a carrier for a catalyst device that is used for environmental measures, recovery of specific materials, or the like. Further, the honeycomb structure made of ceramic is also widely used as a filter for the purification of an exhaust gas such as diesel particulate filter (DPF). Such a honeycomb structure made of ceramic is excellent in heat resistance, and corrosion resistance, and is employed for various applications as described above.

A honeycomb structure is prepared, for example, by mixing a ceramic raw material with a sintering aid and the like to prepare a kneaded clay, and extruding the kneaded clay through a die, and then by firing the extruded product. In the prepared honeycomb structure, defects such as cracks sometimes appear at the end face in the extrusion forming process, the firing process, or the like. In the above-described various applications, if defects such as cracks appear in a partition wall at an end face of a honeycomb structure, the honeycomb structure cannot be used. For this reason, each honeycomb structure is required to be inspected for these defects.

Conventionally, in order to inspect an end face of a honeycomb structure for the defects, the end face has been visually inspected for the defects in general. In addition, as a method for inspecting an end face of a honeycomb structure using a device, for example, there is a method in which an image at an end face of a honeycomb structure is scanned by a scanner using a contact image sensor to obtain an original image at the end face, and the end face is inspected on the basis of the obtained original image (Patent Document 1).

CITATION LIST

Patent Documents

[Patent Document 1] JP-A-2002-257736

SUMMARY OF THE INVENTION

Problem to be Solved by the Invention

As the defects in a partition wall at an end face of a honeycomb structure, chipping and a crack are present. Chipping is a chip at an end face, and a crack is a break of a partition wall in the longitudinal direction of a honeycomb structure. The influence on the characteristics of a product differs between the chipping and the crack, and it is required to determine only the crack as defective.

Conventionally, the crack and the chipping have been distinguished from each other by visual inspection on the end face, and it has taken time to inspect. In addition, in the method described in Patent Document 1, it has been difficult to distinguish whether a defect at an end face was due to chipping or a crack.

An object of the present invention is to provide a method for inspecting an end face of a honeycomb structure, and a device for inspecting an end face of a honeycomb structure, which are able to inspect an end face of a honeycomb structure with high accuracy and high speed.

Means for Solving the Problem

First image data for processing at a first end face of a honeycomb structure are acquired while irradiating the first end face with light having an angle of 40° or more, the angle being an angle formed between the light and an axis being perpendicular to a placement face (second end face) of the honeycomb structure. In addition, second image data for processing at a first end face while irradiating the first end face with light having an angle of less than 40°, the angle being an angle formed between the light and an axis being perpendicular to a placement face of the honeycomb structure. Further, the present inventors have found that the above-described object can be solved with the detection of only a crack by comparing the first image data for processing with the second image data for processing. That is, according to the present invention, the following method for inspecting an end face and the following device for inspecting an end face are provided.

According to a first aspect of the present invention, a method for inspecting an end face is provided, including: an arrangement step of arranging a honeycomb structure having a porous partition wall defining and forming a plurality of cells and extending from a first end face to a second end face, at a predetermined position using the second end face as a placement face; a first image data for processing acquisition step of acquiring first image data for processing at the first end face of the honeycomb structure while irradiating the first end face with light having an angle of 40° or more, the angle being an angle formed between the light and an axis being perpendicular to the placement face of the honeycomb structure; a second image data for processing acquisition step of acquiring second image data for processing at the first end face of the honeycomb structure while irradiating the first end face with light having an angle of less than 40°, the angle being an angle formed between the light and an axis being perpendicular to the placement face of the honeycomb structure; and a crack detection step of detecting a crack in the partition wall by comparing the first image data for processing with the second image data for processing.

According to a second aspect of the present invention, the method for inspecting an end face according to the first aspect is provided, wherein the second image data for processing are acquired after or before acquiring the first image data for processing.

According to a third aspect of the present invention, the method for inspecting an end face according to the first aspect is provided, wherein the light having an angle of 40° or more and the light having an angle of less than 40°, the angle being an angle formed between the light and an axis being perpendicular to the placement face of the honeycomb structure, are lights each having a wavelength different from each other, and using the lights each having a wavelength different from each other, the first image data for processing and the second image data for processing are acquired at the same time.

According to a fourth aspect of the present invention, the method for inspecting an end face according to any one of the first to third aspects is provided, wherein in the crack detection step, the first image data for processing are binarized to determine first binary image data, a width of a defective portion in the partition wall is determined in the first binary image data, and presence or absence of a crack in the partition wall is detected by comparing the width with a predetermined threshold value.

According to a fifth aspect of the present invention, the method for inspecting an end face according to any one of the first to third aspects is provided, wherein in the crack detection step, the first image data for processing are binarized to determine first binary image data, a cell having an area larger than an area of one normal cell is extracted in the first binary image data, and extraction image data of the extracted cell are subjected to contraction processing to detect presence or absence of a crack in the partition wall.

According to a sixth aspect of the present invention, the method for inspecting an end face according to any one of the first to fifth aspects is provided, wherein in the crack detection step, the second image data for processing are binarized to determine second binary image data, a cell having an area larger than an area of one normal cell is extracted on the basis of the second binary image data, and a crack at the first end face is detected.

According to a seventh aspect of the present invention, a device for inspecting an end face of a honeycomb structure is provided, including: an arrangement unit for arranging a honeycomb structure having a porous partition wall defining and forming a plurality of cells and extending from a first end face to a second end face at a predetermined position, by moving the honeycomb structure to the predetermined position using the second end face as a placement face; a first image data for processing acquisition unit for acquiring first image data for processing at the first end face, having a first light source for irradiating the first end face of the honeycomb structure arranged at a first position by the arrangement unit with light having an angle of 40° or more, the angle being an angle formed between the light and an axis being perpendicular to the placement face of the honeycomb structure, and having a first photographing device for photographing the first end face; and a second image data for processing acquisition unit for acquiring second image data for processing at the first end face, having a second light source for irradiating the first end face of the honeycomb structure arranged at a second position by the arrangement unit with light having an angle of less than 40°, the angle being an angle formed between the light and an axis being perpendicular to the placement face of the honeycomb structure, having a second photographing device for photographing the first end face, and being provided at a position different from the position of the first image data for processing acquisition unit.

According to an eighth aspect of the present invention, the device for inspecting an end face of a honeycomb structure according to the seventh aspect is provided, wherein the first photographing device and/or the second photographing device are included in a direction perpendicular to the placement face of the honeycomb structure, as the first light source, at least a pair of light sources are provided at symmetrical positions with respect to the first photographing device, and as the second light source, at least a pair of light sources are provided at symmetrical positions with respect to the second photographing device.

According to a ninth aspect of the present invention, the device for inspecting an end face of a honeycomb structure according to the seventh or eighth aspects is provided, wherein the first photographing device and/or the second photographing device includes a telecentric optical system.

According to a tenth aspect of the present invention, the device for inspecting an end face of a honeycomb structure according to any one of the seventh to ninth aspects is provided, including a mirror for reflecting the light emitted from the first light source and/or the second light source to irradiate the first end face of the honeycomb structure with the light having a predetermined angle.

According to an eleventh aspect of the present invention, a device for inspecting an end face of a honeycomb structure is provided, including: an arrangement unit for arranging a honeycomb structure having a porous partition wall defining and forming a plurality of cells and extending from a first end face to a second end face, at a predetermined position using the second end face as a placement face; a first light source for irradiating the first end face of the honeycomb structure with light having an angle of 40° or more, the angle being an angle formed between the light and an axis being perpendicular to the placement face of the honeycomb structure; a second light source for irradiating the first end face of the honeycomb structure with light having an angle of less than 40°, the angle being an angle formed between the light and an axis being perpendicular to the placement face of the honeycomb structure; a photographing device for acquiring first image data for processing at the first end face by irradiating the first end face with light having an angle of 40° or more from the first light source, the angle being an angle formed between the light and an axis being perpendicular to the placement face of the honeycomb structure, and acquiring second image data for processing at the first end face by irradiating the first end face with light having an angle of less than 40° from the second light source, the angle being an angle formed between the light and an axis being perpendicular to the placement face of the honeycomb structure.

According to a twelfth aspect of the present invention, the device for inspecting an end face of a honeycomb structure according to the eleventh aspect is provided, wherein the photographing device is included in a direction perpendicular to the placement face of the honeycomb structure, as the first light source, at least a pair of light sources are provided at symmetrical positions with respect to the photographing device, and as the second light source, at least a pair of light sources are provided at symmetrical positions with respect to the photographing device.

According to a thirteenth aspect of the present invention, the device for inspecting an end face of a honeycomb structure according to the eleventh or twelfth aspects is provided, wherein the photographing device includes a telecentric optical system.

According to a fourteenth aspect of the present invention, the device for inspecting an end face of a honeycomb structure according to any one of the eleventh to thirteenth aspects is provided, wherein the device for inspecting an end face acquires the second image data for processing by irradiating with light from the second light source after or before acquiring the first image data for processing by irradiating with light from the first light source.

According to a fifteenth aspect of the present invention, the device for inspecting an end face of a honeycomb structure according to any one of the eleventh to thirteenth aspects is provided, wherein the light from the first light source and the light from the second light source are lights each having a wavelength different from each other, and the device for inspecting an end face acquires the first image data for processing and the second image data for processing at the same time.

According to a sixteenth aspect of the present invention, the device for inspecting an end face of a honeycomb structure according to any one of the eleventh to fifteenth aspects is provided, including a mirror for reflecting the light emitted from the first light source and/or the second light source to irradiate the first end face of the honeycomb structure with the light having a predetermined angle.

Effect of the Invention

According to the method for inspecting an end face, and the device for inspecting an end face, of the present invention, by comparing first image data for processing at a first end face acquired by irradiating the first end face with light having an angle of 40° or more, with second image data for processing at a first end face acquired by irradiating the first end face with light having an angle of less than 40°, the angle being an angle formed between the light and an axis being perpendicular to a placement face of the honeycomb structure, chipping and a crack at the end face can be distinguished and detected.

BRIEF DESCRIPTION OF THE DRAWINGS

FIG. 9 is images for processing of a detection point A1 of a honeycomb structure.

FIG. 10 is images for processing of a detection point B1 of a honeycomb structure.

FIG. 11 is images for processing of a detection point C1 of a honeycomb structure.

DETAILED DESCRIPTION OF THE INVENTION

Hereinafter, the embodiments of the present invention will be described while making reference to drawings. The present invention should not be limited to the following embodiments, and changes, modifications, and improvements may be made as long as they do not depart from the gist of the present invention.

1. Device for Inspecting End Face

First Embodiment

Figure 1A:
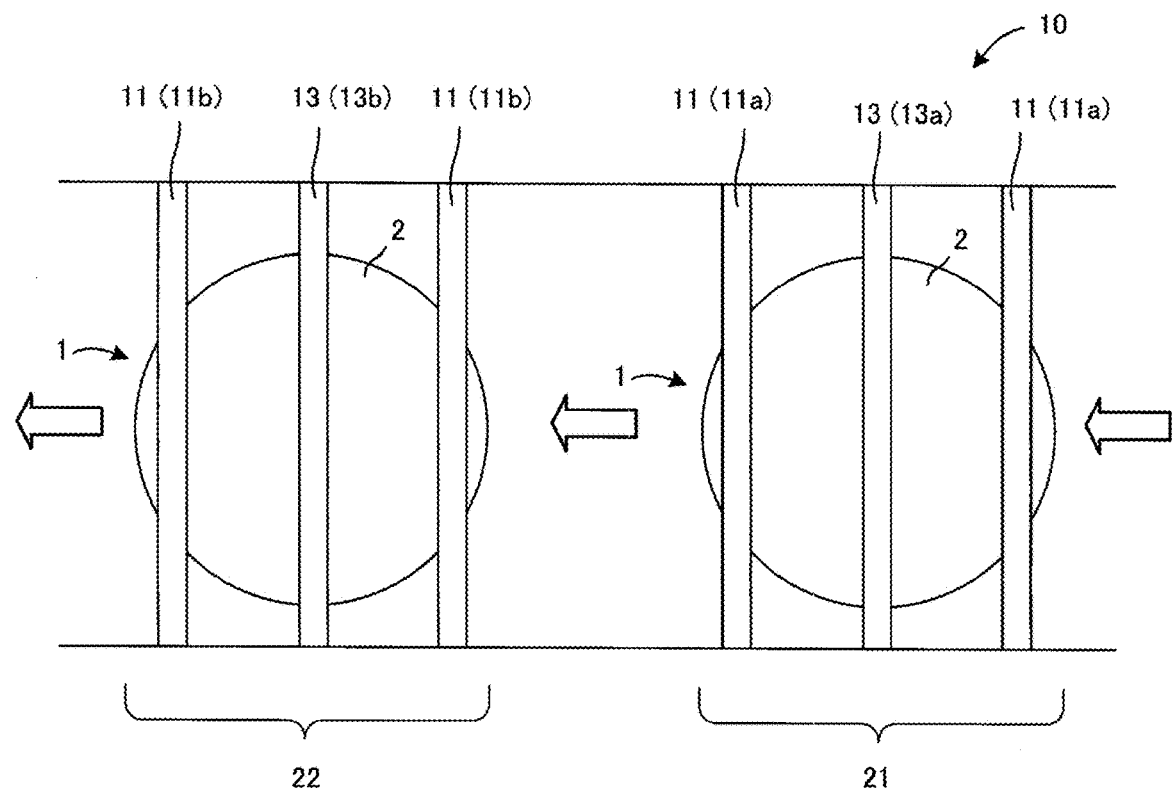
FIG. 1A is a view of a device for inspecting an end face as viewed from above, the device includes a first image data for processing acquisition unit and a second image data for processing acquisition unit, and is used for acquiring image data by moving a honeycomb structure.
Figure 1B:
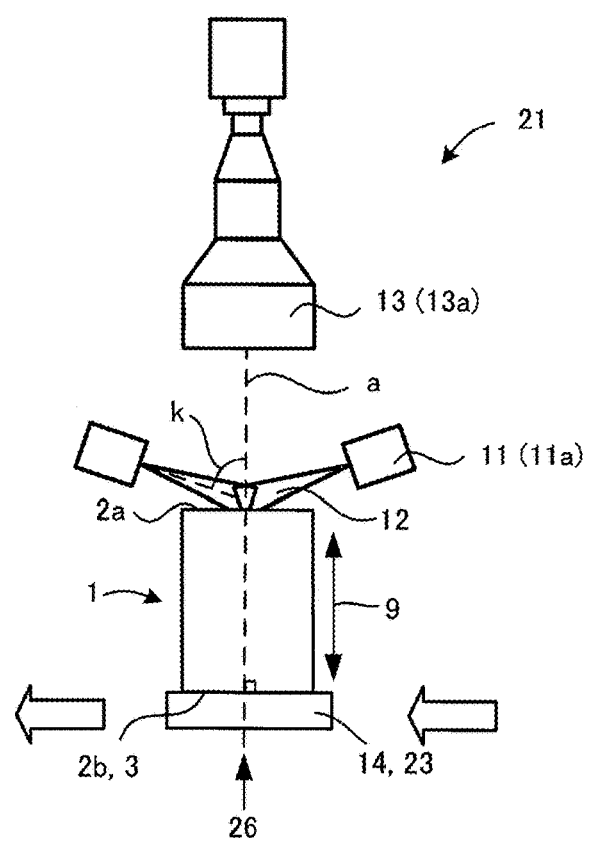
FIG. 1B is a diagram for describing one example of a method for acquiring first image data for processing at a first end face while irradiating the first end face with light having an angle of 40° or more, the angle being an angle formed between the light and an axis being perpendicular to a placement face of a honeycomb structure.
Figure 1C:
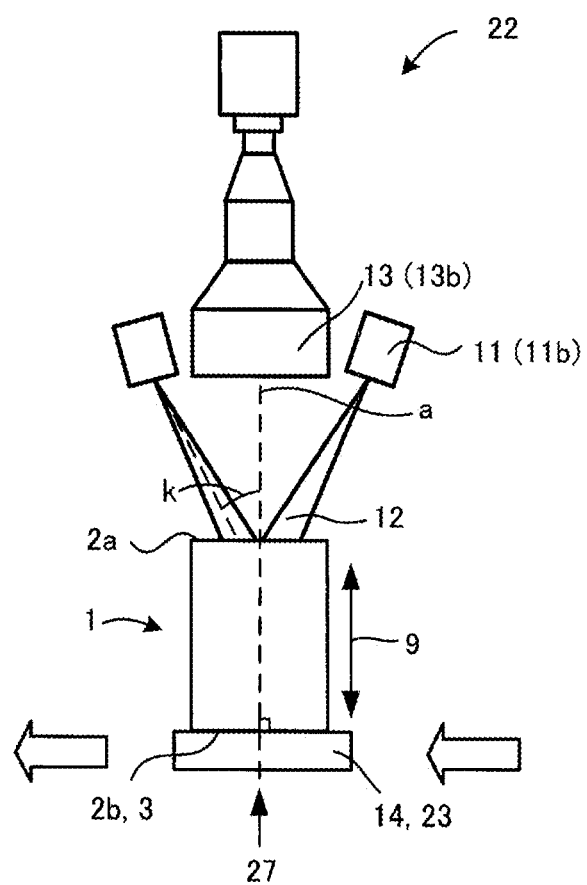
FIG. 1C is a diagram for describing one example of a method for acquiring second image data for processing at a first end face while irradiating the first end face with light having an angle of less than 40°, the angle being an angle formed between the light and an axis being perpendicular to a placement face of a honeycomb structure.

FIG. 1A is a schematic view of a device for inspecting an end face 10 as viewed from above, the device for inspecting an end face 10 includes a first image data for processing acquisition unit 21 and a second image data for processing acquisition unit 22, and is used for acquiring image data by moving a honeycomb structure 1. FIG. 1B and FIG. 1C each are a diagram showing a part of a device for inspecting an end face 10 as viewed from the side. Further, FIG. 1B is a diagram for describing a method for acquiring first image data for processing at a first end face 2a while irradiating the first end face 2a with light 12 having an angle k of 40° or more, the angle k being an angle formed between the light 12 and an axis a being perpendicular to a placement face 3 of a honeycomb structure 1 of the present invention. Furthermore, FIG. 1C is a diagram for describing a method for acquiring second image data for processing at a first end face 2a while irradiating the first end face 2a with light 12 having an angle k of less than 40°, the angle k being an angle formed between the light 12 and an axis a being perpendicular to a placement face 3 of a honeycomb structure 1.

A device for inspecting an end face 10 shown in FIG. 1A to FIG. 1C include an arrangement unit 23, a first image data for processing acquisition unit 21, and a second image data for processing acquisition unit 22. In the first embodiment, a honeycomb structure 1 is arranged at a first position 26 and first image data for processing are acquired, and then the honeycomb structure 1 is moved to the second position 27 and second image data for processing are acquired. Note that the expression "honeycomb structure 1 is arranged at a first position 26" is referred to including not only the case of placing the honeycomb structure 1 in a stationary state at the first position 26, but also the case of passing through the first position 26 while moving the honeycomb structure 1. This also applies to a second position 27.

In an arrangement unit 23, a honeycomb structure 1 having a porous partition wall 4 defining and forming multiple cells 5 and extending from a first end face 2a to a second end face 2b is arranged by moving the honeycomb structure 1 to a predetermined position using a second end face 2b as a placement face 3.

In a first image data for processing acquisition unit 21, a first light source 11a for irradiating a first end face 2a of a honeycomb structure 1 arranged at a first position 26 by the arrangement unit 23 with light 12 having an angle of 40° or more, the angle being an angle formed between the light 12 and an axis a being perpendicular to a placement face 3 of the honeycomb structure 1, and a first photographing device 13a for photographing the first end face 2a are included, and first image data for processing at the first end face 2a are acquired.

In a second image data for processing acquisition unit 22, a second light source 11b for irradiating a first end face 2a of a honeycomb structure 1 arranged at a second position 27 by the arrangement unit 23 with light 12 having an angle of less than 40°, the angle being an angle formed between the light 12 and an axis a being perpendicular to a placement face 3 of the honeycomb structure 1, and a second photographing device 13b for photographing the first end face 2a are included, and second image data for processing at the first end face 2a are acquired. The second image data for processing acquisition unit 22 is provided at a position different from the position of the first image data for processing acquisition unit 21. Note that in FIG. 1A, the first image data for processing acquisition unit 21 is in the upstream, and the second image data for processing acquisition unit 22 is in the downstream, however, these may also be in reverse.

Figure 1D:
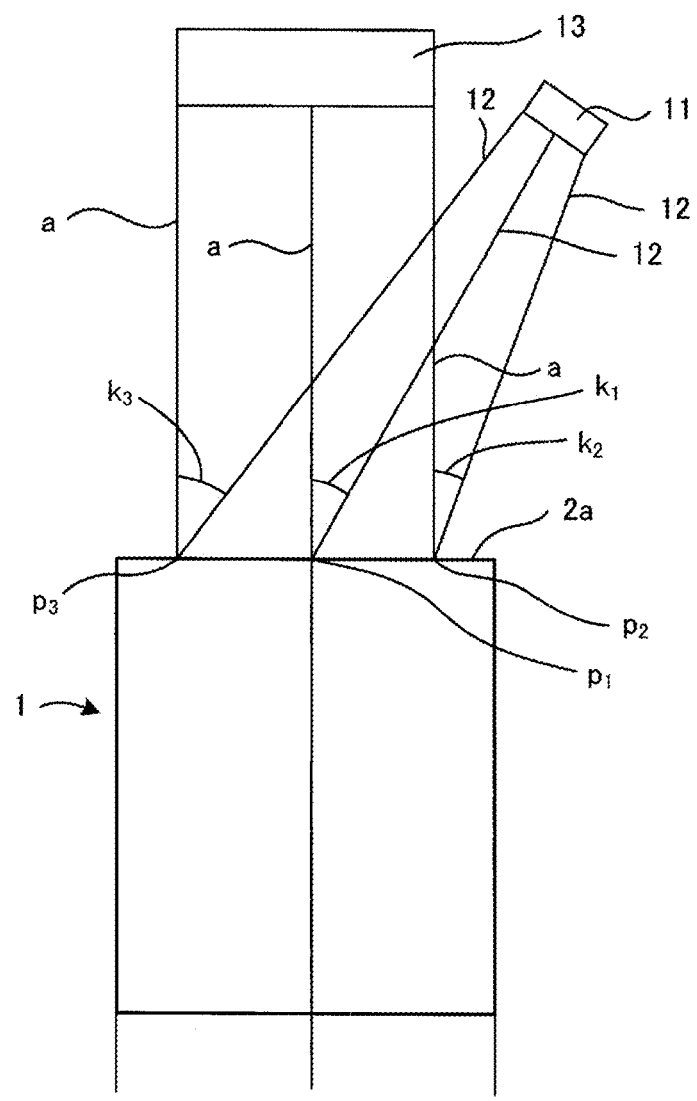
FIG. 1D is another explanatory diagram for describing the angle formed between light and an axis being perpendicular to a placement face of a honeycomb structure.

As shown in FIG. 1D, there are various points such as a point $p_2$, and a point $p_3$, in addition to a point $p_1$ on a first end face 2a of a honeycomb structure 1. In the present specification, a case of the expression "light 12 having an angle of less than 40°" means that the angle formed between the light 12 and an axis a (vertical axis) that is perpendicular to a placement face 3 of a honeycomb structure 1 is less than 40° in the photographing visual field. In FIG. 1D, angles $k_1$, $k_2$, and $k_3$ are less than 40° at any point of the points $p_1$ to $p_3$ in the photographing visual field. Further, this also applies to the case of 40° or more.

A first photographing device 13a as shown in FIG. 1B, and/or a second photographing device 13b as shown in FIG. 1C are preferably included to be opposed to a first end face 2a of a honeycomb structure 1, and is preferably included to be in a direction perpendicular to a placement face 3 of the honeycomb structure 1. As a first light source 11a, at least a pair of light sources are provided at symmetrical positions with respect to a first photographing device 13a. As a second light source 11b, at least a pair of light sources are provided at symmetrical positions with respect to a second photographing device 13b.

In addition, as shown in FIG. 1A, the first photographing device 13a, and/or the second photographing device 13b may be used with a line sensor. The line sensor is preferably longer than the length in a direction perpendicular to the moving direction of a first end face 2a of a honeycomb structure 1 to be photographed. Further, it is preferred to have at least a pair of light sources 11 arranged at positions sandwiching the line sensor in between, and as the light source 11, line illumination is preferably used. When a line sensor is used, it is preferred that the light of the light source 11 is narrowed so as to be close to the width of the line sensor on a first end face 2a.

When the line sensor is used, the photographing can be performed while moving a honeycomb structure 1 (without stopping). When the photographing is performed with the line sensor while moving the honeycomb structure 1, the tact can be made faster. Further, an area camera (sensor) may be used, but in this case, it is preferred to temporarily stop the honeycomb structure 1 to perform the photographing. In addition, as the light source 11, a LED light source, a laser light source, a halogen light source, a metal halide light source, or the like can be used.

The photographing device 13 preferably includes a telecentric optical system. When the telecentric optical system is included, the reflection of a partition wall 4 (rib) disappears, therefore, it is preferred for inspecting the entire first end face 2a of a honeycomb structure 1.

Second Embodiment

Figure 2A:
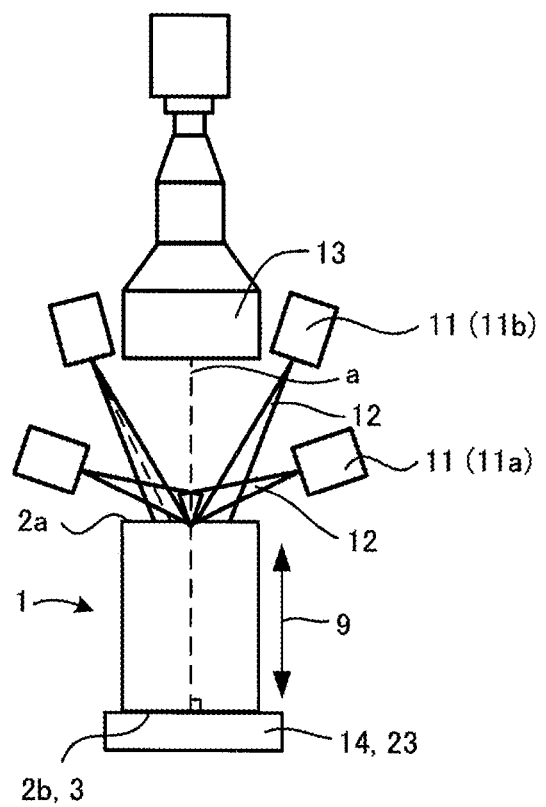
FIG. 2A is a diagram showing the second embodiment of a device for inspecting an end face, by the device, the device is used for acquiring image data without moving a honeycomb structure, or for acquiring image data by passing through a predetermined position while moving a honeycomb structure.

FIG. 2A is a diagram showing the second embodiment of a device for inspecting an end face 10. In the second embodiment, an arrangement unit 23, a first light source 11a, a second light source 11b, and a photographing device 13 are included. In the second embodiment, a honeycomb structure 1 is arranged at a predetermined position, then first image data for processing and second image data for processing are acquired. Note that also in the present embodiment, the expression "honeycomb structure 1 is arranged at a predetermined position" is referred to including not only the case of placing the honeycomb structure 1 in a stationary state at a predetermined position, but also the case of passing through the predetermined position while moving the honeycomb structure 1.

In an arrangement unit 23 (table 14), a honeycomb structure 1 having a porous partition wall 4 defining and forming multiple cells 5 and extending from a first end face 2a to a second end face 2b is arranged at a predetermined position by using the second end face 2b as a placement face 3.

The first light source 11a irradiates a first end face 2a of a honeycomb structure 1 with light 12 having an angle of 40° or more, the angle is an angle formed between the light 12 and an axis a being perpendicular to a placement face 3 of the honeycomb structure 1. The second light source 11b irradiates a first end face 2a of a honeycomb structure 1 with light 12 having an angle of less than 40°, the angle is an angle formed between the light 12 and an axis a being perpendicular to a placement face 3 of the honeycomb structure 1.

The photographing device 13 works for acquiring first image data for processing at a first end face 2a by irradiating the first end face 2a with light 12 having an angle of 40° or more by the first light source 11a, the angle being an angle formed between the light 12 and an axis a being perpendicular to a placement face 3 of the honeycomb structure 1. Further, the photographing device 13 also works for acquiring second image data for processing at a first end face 2a by irradiating the first end face 2a with light 12 having an angle of less than 40° by the second light source 11b, the angle being an angle formed between the light 12 and an axis a being perpendicular to a placement face 3 of the honeycomb structure 1.

It is preferred that the photographing device 13 is arranged in a direction perpendicular to a placement face 3 of a honeycomb structure 1. Further, it is preferred that as the first light source 11a, at least a pair of light sources are provided at symmetrical positions with respect to the photographing device 13, and as the second light source 11b, at least a pair of light sources are provided at symmetrical positions with respect to the photographing device 13.

As the photographing device 13 in the second embodiment, an area camera may be used. Further, the photographing device 13 preferably includes a telecentric optical system. By the area camera, the entire first end face of a honeycomb structure 1 can be photographed. Alternatively, multiple area cameras may be included, and the first end face 2a may be photographed by being divided. In addition, also in the second embodiment, a line sensor may be used.

As the illumination including a light source 11, it is not particularly limited, line illumination and point illumination may be used, and illumination capable of irradiating the entire first end face 2a is preferred. In addition, as the light source 11, a LED light source, a laser light source, a halogen light source, a metal halide light source, or the like can be used.

Further, the distance between the first end face 2a of a honeycomb structure 1 and the light source 11 is not particularly limited, and the position may be any position as long as favorable first image data for processing are acquired.

In the second embodiment, the second image data for processing can be acquired by arranging the honeycomb structure 1 at a predetermined position, and then by performing irradiation with light 12 from the second light source 11b after or before acquiring the first image data for processing by performing irradiation with light 12 from the first light source 11a. Either data of the first image data for processing or the second image data for processing may be acquired first. The first image data for processing and the second image data for processing are acquired at the same position without moving a honeycomb structure 1.

The light 12 of the first light source 11a and the light 12 of the second light source 11b may be lights each having a wavelength different from each other. In this case, the first image data for processing and the second image data for processing can be acquired at the same time. As the lights 12 each having a wavelength different from each other, for example, a blue light source and a red light source may be used. In a case where the first image data for processing and the second image data for processing are acquired at the same time, the first image data for processing and the second image data for processing are included in one image data for processing. In this case, the first image data for processing and the second image data for processing can be separated from each other from the RGB data of one image data for processing.

Third Embodiment

Using FIG. 2B and FIG. 2C, the third embodiment will be described. The device for inspecting an end face 10 in the third embodiment includes an arrangement unit 23, a first image data for processing acquisition unit 21, and a second image data for processing acquisition unit 22. Further, the device for inspecting an end face 10 in the third embodiment includes a reversing device 28 for reversing up and down a honeycomb structure 1.

Figure 2B:
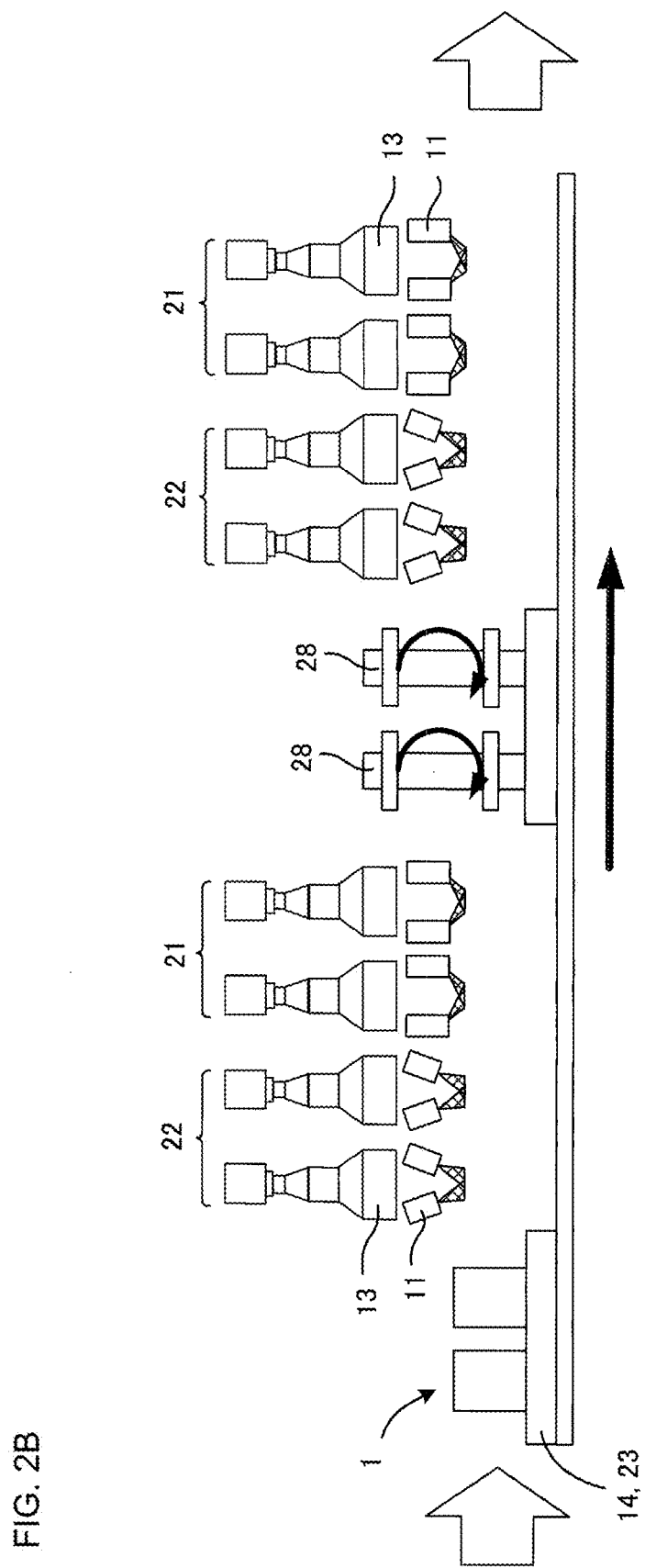
FIG. 2B is a view of the third embodiment of a device for inspecting an end face as viewed from the side.

As shown in FIG. 2B, in the third embodiment, two honeycomb structures 1 are placed on a table 14 as one set, and moved. At first, second image data for processing of a first end face 2a are acquired by a second image data for processing acquisition unit 22, and first image data for processing of a first end face 2a are acquired by a first image data for processing acquisition unit 21. After that, the honeycomb structure 1 is reversed up and down by a reversing device 28, and image data for processing for the second end face 2b are acquired in a similar way.

Figure 2C:
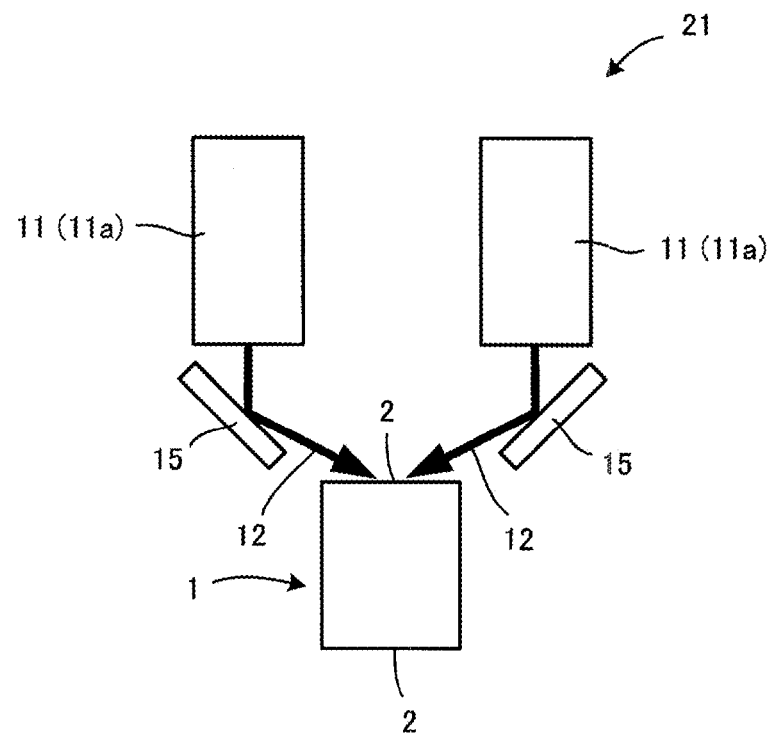
FIG. 2C is a diagram showing the embodiment in which a mirror that changes an angle of light from a light source is included.

As shown in FIG. 2C, the first image data for processing acquisition unit 21 includes a mirror 15 between a first light source 11a and a honeycomb structure 1. The mirror 15 is for reflecting the light 12 emitted from a first light source 11a, and irradiating an end face 2 (first end face 2a, or second end face 2b) of a honeycomb structure 1 with light 12 having a predetermined angle. By including the mirror 15, the angle of the light 12 with which the end face 2 of the honeycomb structure 1 is irradiated can easily be set to a desired angle. In addition, since the size of the first image data for processing acquisition unit 21 can be made compact, the arrangement interval between the acquisition units can be narrowed, and the moving distance of the honeycomb structure 1 can be shortened (=inspection time can be shortened). Further, the mirror 15 may also be included in the second image data for processing acquisition unit 22.

The third embodiment is constituted such that by including the reversing device 28, not only a first end face 2a but also a second end face 2b can be inspected. Other embodiments may also be constituted such that by reversing a honeycomb structure 1 in a similar way, not only a first end face 2a but also a second end face 2b can be inspected.

Object to be Inspected

Honeycomb Structure

Figure 3A:
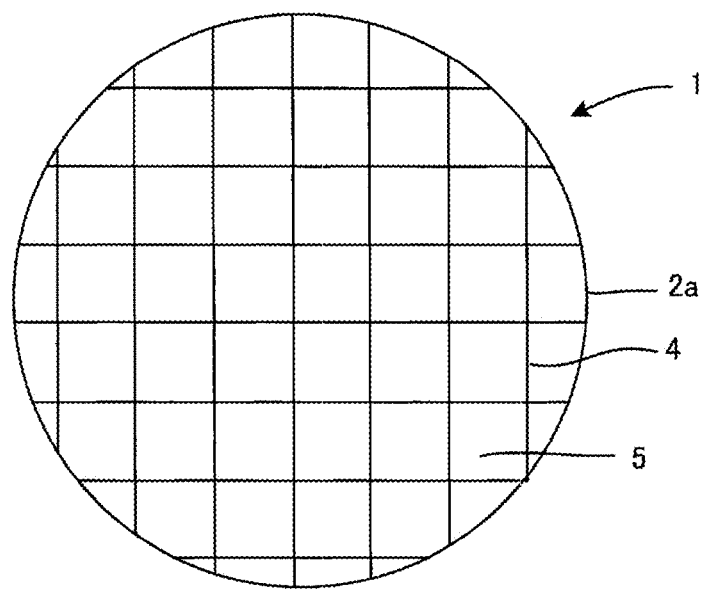
FIG. 3A is a schematic view showing a honeycomb structure as viewed from the first end face in the axis direction.
Figure 3B:
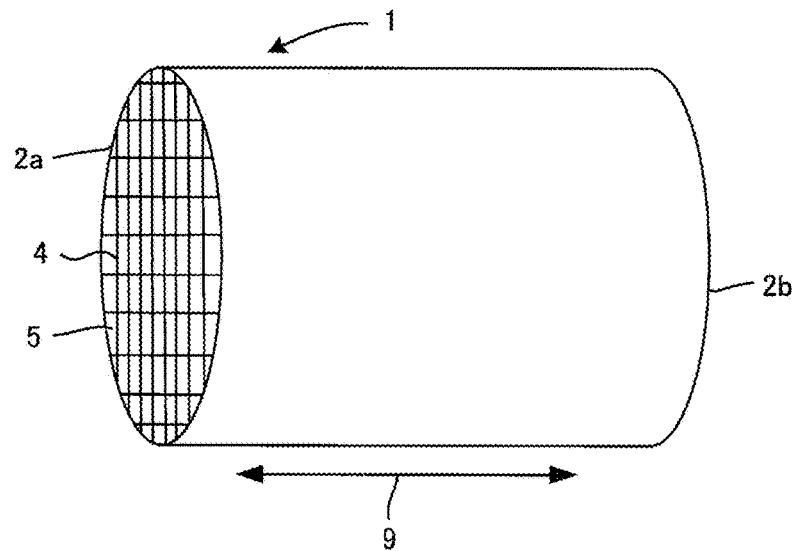
FIG. 3B is a perspective view showing a honeycomb structure.

In FIG. 3A, a schematic view of one example of a honeycomb structure 1 used as an object to be inspected by the method for inspecting an end face of the present invention as viewed from one end face 2 in the axis direction 9 is shown. In FIG. 3B, a perspective view of a honeycomb structure 1 is shown. The honeycomb structure 1 is formed in a pillar shape, and has a flow path of a fluid passing from a first end face 2a to a second end face 2b in the axis (longitudinal) direction 9. The honeycomb structure 1 has partition walls 4, and a large number of cells 5 that are flow paths of a fluid are defined and formed by the partition walls 4.

The honeycomb structure 1 is not particularly limited, and any shape, any size, and any material may be accepted. Accordingly, the outer shape of a honeycomb structure 1 is not limited to a round pillar shape, and the cross section perpendicular to the axis (longitudinal) direction 9 may be an elliptical shape. Further, the outer shape of the honeycomb structure 1 may be a prismatic pillar shape, that is, the cross section perpendicular to the axis (longitudinal) direction 9 may be a square shape, or a shape of other polygons.

Figure 4A:
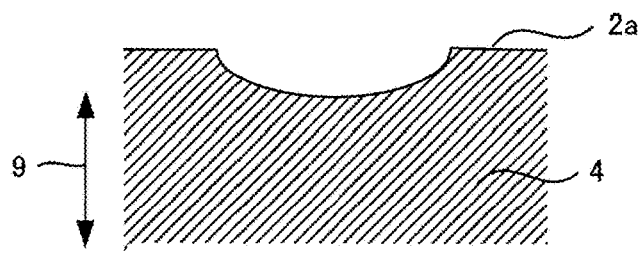
FIG. 4A is a sectional view showing one example of a partition wall having chipping at a first end face.
Figure 4B:
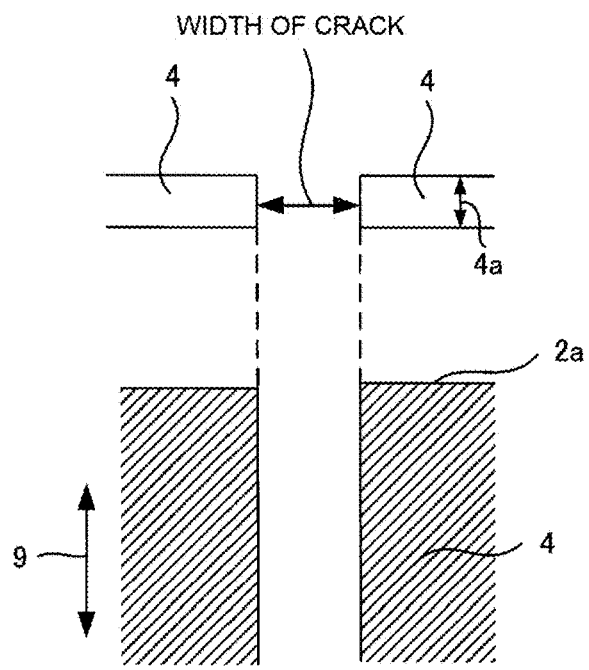
FIG. 4B is a sectional view showing one example of a partition wall having a crack at a first end face.

The thickness of a partition wall 4 of a cell 5 in a honeycomb structure 1 (wall thickness 4a (or also referred to as "rib thickness"): see FIG. 4B), and also the density of a partition wall 4 may be appropriately designed depending on the intended purpose, and there is no particular limitation.

As the honeycomb structure 1, one having ceramic as the main component is preferably used. Note that the expression "having ceramic as the main component" in the present specification is referred to as containing 50% by mass or more of ceramics.

Defects

As the defects of a partition wall 4 at an end face 2 of a honeycomb structure 1, chipping and a crack can be mentioned. In FIG. 4A, a sectional view showing one example of a partition wall 4 having chipping at a first end face 2a is shown. Further, in FIG. 4B, a sectional view showing one example of a partition wall 4 having a crack at a first end face 2a is shown. Note that the upper view of FIG. 4B is a view of a first end face 2a as viewed from the front. The crack is a break of the end face 2.

Image Data for Processing

Figure 5A:
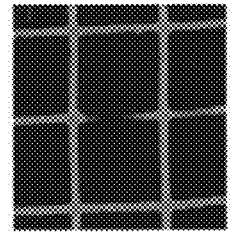
FIG. 5A is an image showing one example of a first image for processing obtained by photographing a first end face of a honeycomb structure having chipping at the first end face.
Figure 5B:
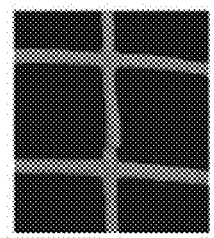
FIG. 5B is an image showing one example of a first image for processing obtained by photographing a first end face of a honeycomb structure having a crack with a narrow width at the first end face.
Figure 5C:
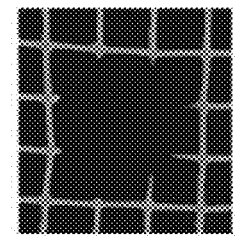
FIG. 5C is an image showing one example of a first image for processing obtained by photographing a first end face of a honeycomb structure having a crack with a wide width at the first end face.
Figure 5D:
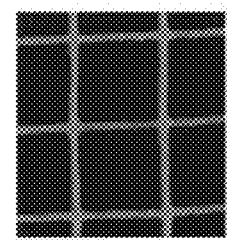
FIG. 5D is an image showing one example of a second image for processing obtained by photographing a first end face of a honeycomb structure having chipping at the first end face.
Figure 5E:
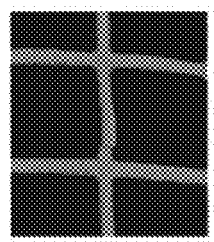
FIG. 5E is an image showing one example of a second image for processing obtained by photographing a first end face of a honeycomb structure having a crack with a narrow width at the first end face.
Figure 5F:
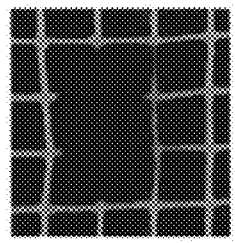
FIG. 5F is an image showing one example of a second image for processing obtained by photographing a first end face of a honeycomb structure having a crack with a wide width at the first end face.

Image data for processing will be described. In FIG. 5A to FIG. 5F, one example of an image for processing obtained by photographing a first end face 2a having chipping, a crack with a narrow width, or a crack with a wide width in a partition wall 4 is shown. FIG. 5A to FIG. 5C each show a first image for processing obtained by photographing a first end face 2a while irradiating the first end face 2a with light 12 having an angle k of 40° or more, the angle k being an angle formed between the light 12 and an axis a being perpendicular to a placement face 3 of the honeycomb structure 1. FIG. 5D to FIG. 5F each show a second image for processing obtained by photographing a first end face 2a while irradiating the first end face 2a with light 12 having an angle k of less than 40°, the angle k being an angle formed between the light 12 and an axis a being perpendicular to a placement face 3 of the honeycomb structure 1. Further, FIG. 5A and FIG. 5D each show an image for processing of a first end face 2a having chipping in a partition wall 4. FIG. 5B and FIG. 5E each show an image for processing of a first end face 2a having a crack with a narrow width in a partition wall 4. FIG. 5C and FIG. 5F each show an image for processing of a first end face 2a having a crack with a wide width in a partition wall 4.

In a first image for processing obtained by photographing a first end face 2a while irradiating the first end face 2a with light 12 having an angle k of 40° or more, the angle k being an angle formed between the light 12 and an axis a being perpendicular to a placement face 3 of the honeycomb structure 1, a crack with a narrow width can be satisfactorily confirmed as shown in FIG. 5B. This is because the shadow of the crack is emphasized by the emitted light 12. However, the emitted light 12 does not reach the back of a cell 5 in the longitudinal direction of a honeycomb structure 1, therefore as shown in FIG. 5A and FIG. 5C, it is difficult to distinguish between chipping and a crack with a wide width.

On the other hand, in a second image for processing obtained by photographing a first end face 2a while irradiating the first end face 2a with light 12 having an angle k of less than 40°, the angle k being an angle formed between the light 12 and an axis a being perpendicular to a placement face 3 of the honeycomb structure 1, it can be distinguished whether the thick defect is chipping or a crack, as shown in FIG. 5D and FIG. 5F. This is because even the back of the cell 5 in the longitudinal direction of the honeycomb structure 1 is irradiated with the light 12. However, as shown in FIG. 5E, it is difficult to detect a crack with a narrow width.

Accordingly, by inspecting the end face in combination of the first image data for processing capable of detecting a crack with a narrow width and the second image data for processing capable of detecting a crack with a wide width, only a crack such as a crack with a narrow width, and a crack with a wide width can be detected. Further, by matching the position coordinates of the first image data for processing and the second image data for processing, chipping can be detected and distinguished from a crack.

2. Method for Inspecting End Face

Overview of Method for Inspecting End Face

The method for inspecting an end face of the present invention includes the following steps. A honeycomb structure 1 having a porous partition wall 4 defining and forming multiple cells 5 and extending from a first end face 2a to a second end face 2b is arranged at a predetermined position by placing on a table 14 using the second end face 2b as a placement face 3 (arrangement step). Further, first image data for processing at the first end face 2a of the honeycomb structure 1 are acquired while irradiating the first end face 2a with light 12 having an angle k of 40° or more, the angle k being an angle formed between the light 12 and an axis a being perpendicular to a placement face 3 of the honeycomb structure 1 (first image data for processing acquisition step). Furthermore, second image data for processing at the first end face 2a of the honeycomb structure 1 are acquired while irradiating the first end face 2a with light 12 having an angle k of less than 40°, the angle k being an angle formed between the light 12 and an axis a being perpendicular to a placement face 3 of the honeycomb structure 1 (second image data for processing acquisition step). By comparing the thus acquired first image data for processing with the thus acquired second image data for processing, a crack is detected (crack detection step).

The constitution can be made such that the second image data for processing are acquired after or before acquiring the first image data for processing. Alternatively, by setting the light 12 having an angle of 40° or more and the light 12 having an angle of less than 40°, the angle being an angle formed between the light 12 and an axis a being perpendicular to a placement face 3 of the honeycomb structure 1, and lights 12 each having a wavelength different from each other, the constitution can also be made such that the first image data for processing and the second image data for processing are acquired at the same time.

In the crack detection step, the first image data for processing are binarized to determine first binary image data, a cell 5 having an area larger than the area of one normal cell is extracted in the first binary image data, and extraction image data of the extracted cell 5 are subjected to contraction processing to detect the presence or absence of a crack in a partition wall 4.

In the crack detection step, the second image data for processing are binarized to determine second binary image data, a cell 5 having an area larger than the area of one normal cell is extracted on the basis of the second binary image data, and a crack at the end face 2 is detected.

In addition, in the crack detection step, a method in which binary image data are subjected to contraction processing to detect the presence or absence of a crack in a partition wall 4 has been described, however, by determining the width of a defective portion in a partition wall 4 in the binary image data, and by comparing the width with a predetermined threshold value, the presence or absence of a crack in the partition wall 4 can also be detected.

Details of Method for Inspecting End Face

Specific steps of the method for inspecting an end face will be described in detail below. Specifically, photographing of first image data for processing and a method for image data processing (detection of a crack with a narrow width in a partition wall 4), and photographing of second image data for processing and a method for image data processing (detection of a crack with a wide width in a partition wall 4) will be described. Note that as to the width of a crack, for example, the narrow width is less than 100 µm, and the wide width is 100 µm or more. However, the separation between the narrow width and the wide width can be changed depending on the degree of contraction in contraction processing, therefore, the separation can be made with a desired value.

Figure 6:
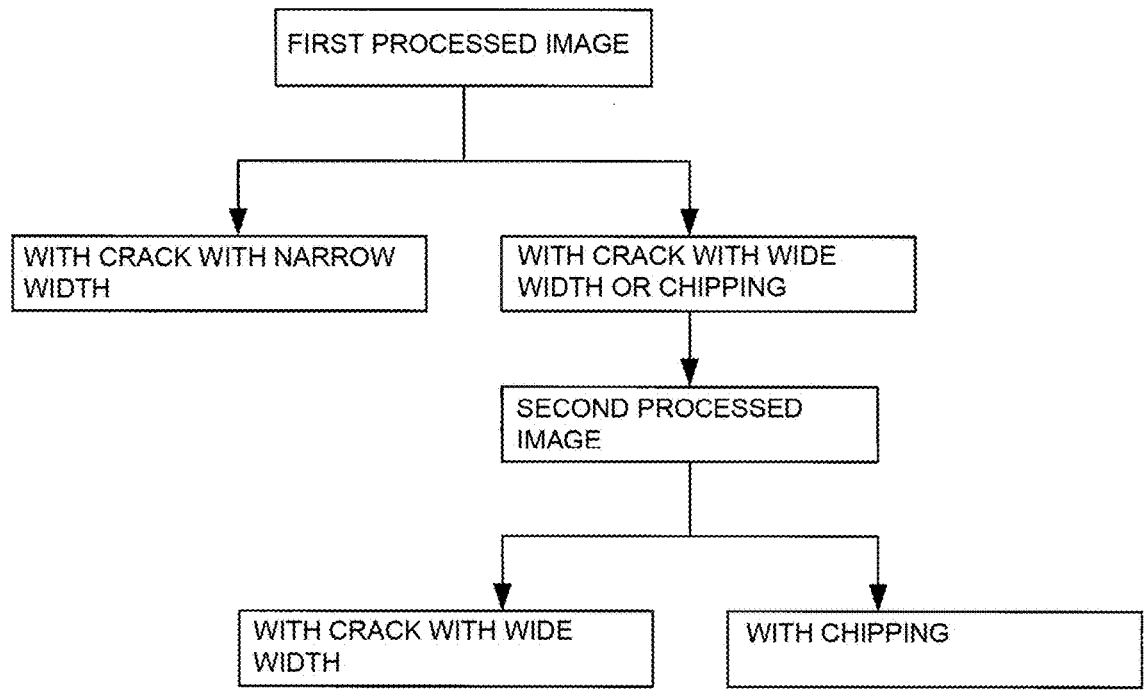
FIG. 6 is a diagram for describing a flow of image processing.

In FIG. 6, steps of the method for inspecting an end face are shown. By the first processed image data, a crack with a narrow width, and a crack with a wide width or chipping are distinguished from each other. Further, by the second processed image data, a crack with a wide width, and chipping are distinguished from each other.

In addition, as to the photographing of first image data for processing, and the photographing of second image data for processing, either one may be performed first, or both may be performed at the same time. Further, the processing of the first image data for processing is performed first in FIG. 6, however, the processing of the second image data for processing may be performed first. In a case where both of the first image data for processing and the second image data for processing are photographed at the same time, a first end face 2a of a honeycomb structure 1 is irradiated at the same time with light 12 having an angle k of 40° or more and light 12 having an angle k of less than 40°, the angle k being an angle formed between the light 12 and an axis a being perpendicular to a placement face 3 of the honeycomb structure 1. For this reason, for the light 12 having an angle k of 40° or more and the light 12 having an angle k of less than 40°, the angle k being an angle formed between the light 12 and an axis a being perpendicular to a placement face 3 of the honeycomb structure 1, it is preferred to use lights 12 each having a wavelength different from each other. By using the lights 12 each having a wavelength different from each other, two images with different irradiation angles can be obtained in one imaging. In this way, the inspection time becomes shortened, and further, an effect in which the position coordinate matching when extracting only the chipping becomes simple can be obtained. Hereinafter, as shown in FIG. 6, a case where the processing of the first image data for processing is performed first will be described as an example.

Processing of First Image Data for Processing

As shown in FIG. 1B, a honeycomb structure 1 is arranged on a table 14 using a second end face 2b as a placement face 3. Further, first image data for processing at a first end face 2a of the honeycomb structure 1 are acquired while irradiating the first end face 2a with light 12 having an angle k of 40° or more, the angle k being an angle formed between the light 12 and an axis a being perpendicular to the placement face 3 of the honeycomb structure 1.

The light 12 is emitted from a light source 11 toward the first end face 2a of the honeycomb structure 1. The angle k formed between the light 12 to be emitted and the axis a being perpendicular to the placement face 3 of the honeycomb structure 1 is 40° or more. More preferably the above angle k is 60° to 80°. This means that the angle of the light 12 from the light source 11 is 60° to 80° at any point on the first end face 2a. By setting the above angle k to 40° or more, image data of a crack with a narrow width can be photographed satisfactorily.

Figure 7A:
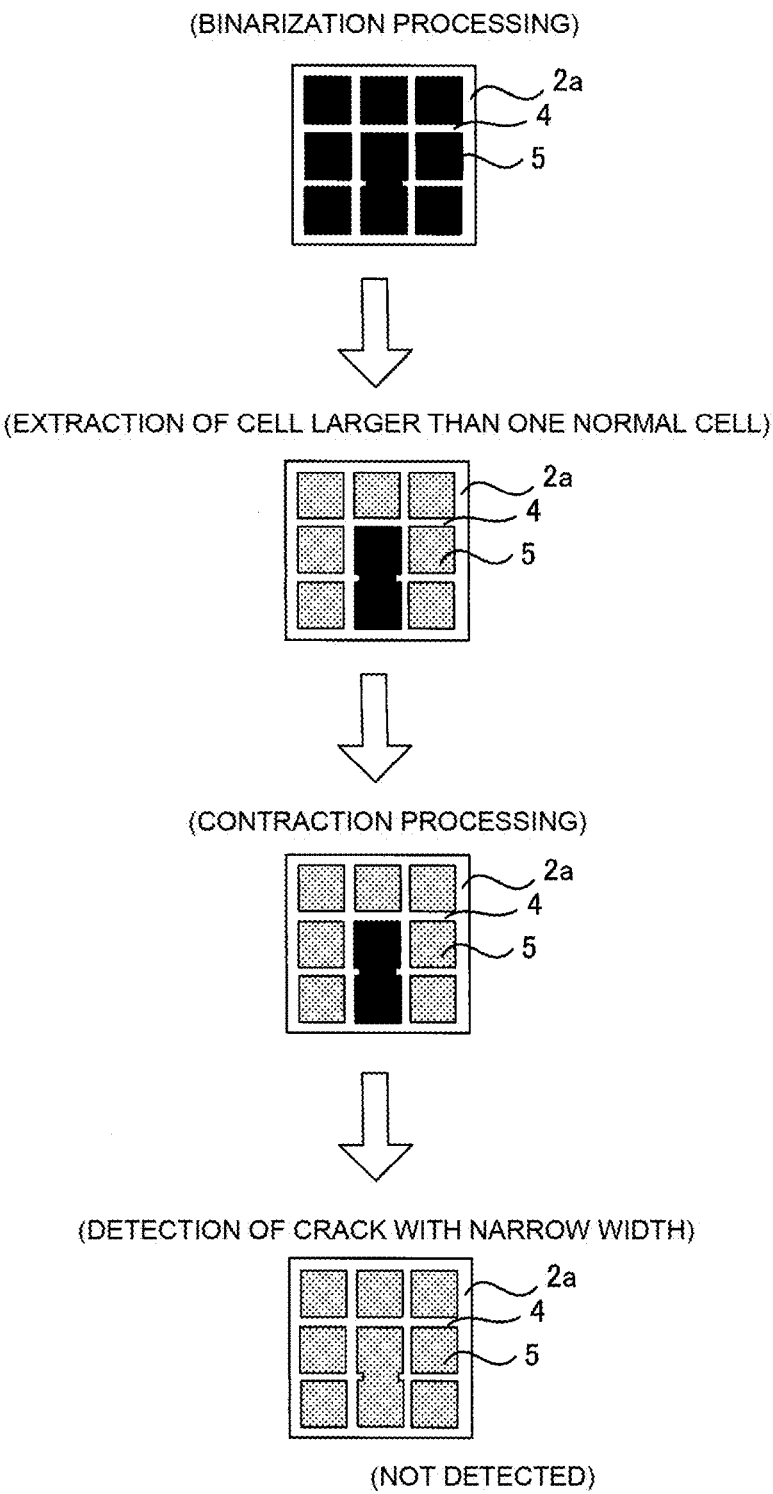
FIG. 7A is an explanatory diagram showing one embodiment of a method for performing image processing by using first image data for processing.
Figure 7B:
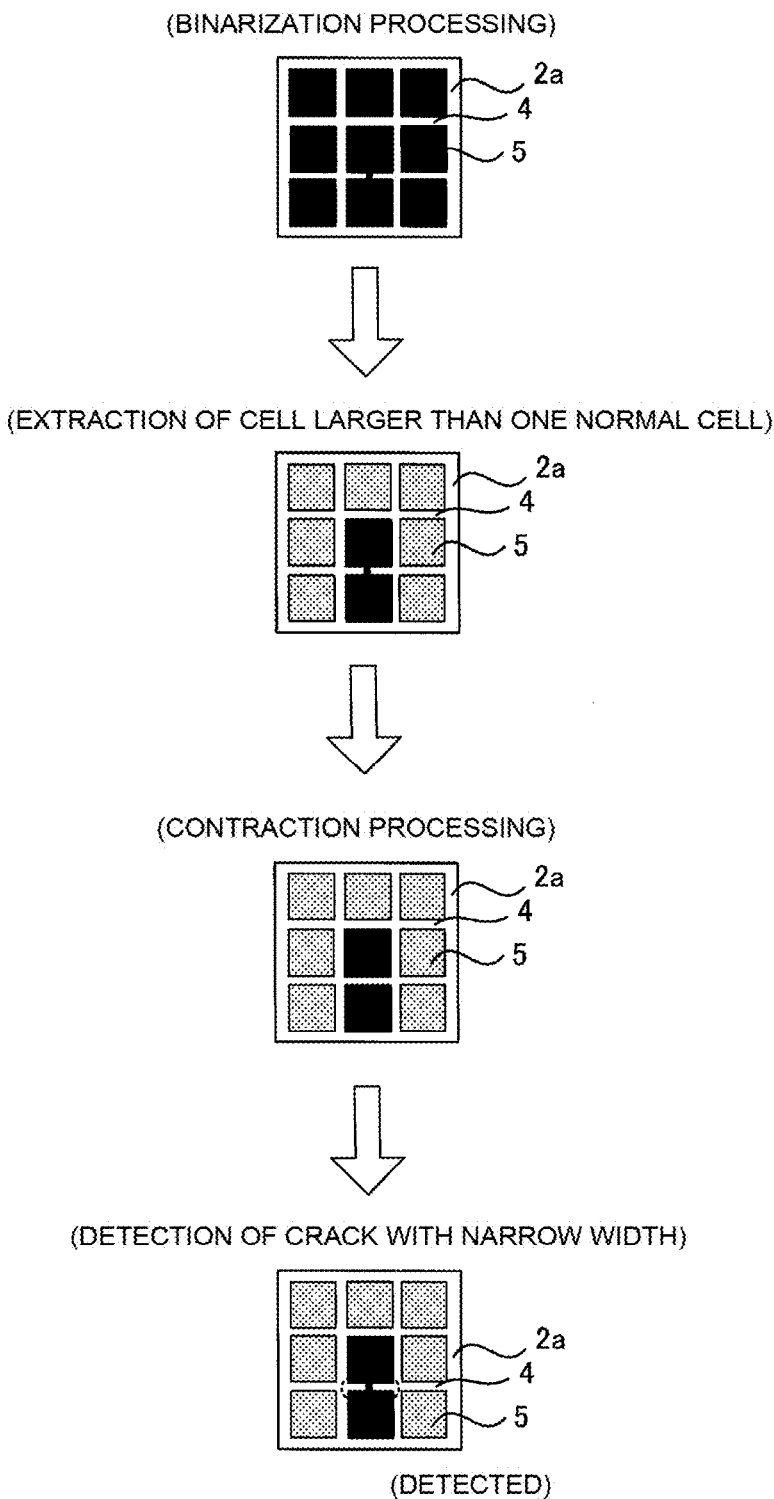
FIG. 7B is an explanatory diagram showing another embodiment of a method for performing image processing by using first image data for processing.

Next, according to the procedures shown in FIG. 7A and FIG. 7B, a crack with a narrow width at the first end face 2a is detected by using the acquired first image data for processing. In addition, as shown in FIG. 5A and FIG. 5C, in the photographing of the first image for processing, chipping is also photographed similarly as in the case of a crack with a wide width in a partition wall 4 at the first end face 2a. Accordingly, it is difficult to distinguish between the crack with a wide width and the chipping on the basis of the first image for processing. Therefore, it is preferred not to detect a crack with a wide width by using the first image for processing.

The first image data for processing are subjected to image processing by a computer, and the resultant data are used for detecting a crack with a narrow width, and the method for image processing is not particularly limited, and a known computer image processing method may be used. For example, a method such as binarization can be mentioned.

FIG. 7A shows a method for image processing using the first image data for processing in a case where a honeycomb structure 1 has a crack with a wide width or chipping in a partition wall 4. Further, FIG. 7B shows a method for image processing using the first image data for processing in a case where a honeycomb structure 1 has a crack with a narrow width in a partition wall 4. In image processing using binarization, at first, first image data for processing are binarized to determine the first binary image data, and a cell 5 having an area larger than the area of one normal cell is extracted in the first binary image data. Next, it is preferred that extraction image data of the extracted cell 5 are subjected to contraction processing, and the presence or absence of a crack with a narrow width in a partition walls 4 is detected according to whether or not there are multiple cells 5 divided by partition walls 4 in the extraction image data.

In the diagram of the first stage in FIG. 7A and in the diagram of the first stage in FIG. 7B, a schematic explanatory diagram when first image data for processing are subjected to binarization processing is shown. Note that the binarization processing can be performed using an arbitrary value of luminance as a threshold value. In addition, the binarization processing may be performed with any one of the luminances of R, G, and B of the RGB data included in the image data. When the first image data for processing are binarized to determine first binary image data, a cell 5 and a partition wall 4 are separated as different regions. A cell 5 that does not have any partition walls 4 having a crack or chipping on the four sides appears as a cell 5 having a normal cell area. On the other hand, a cell 5 having a crack or chipping on any one of the sides is connected to the adjacent cell 5 sandwiching the partition wall 4 having a crack or chipping between the cells, and is observed as a cell 5 having an area larger than the area of one normal cell. Further, as shown in the diagram of the second stage in FIG. 7A and in the diagram of the second stage in FIG. 7B, a cell 5 having an area larger than the area of one normal cell is extracted in such the first binary image data.

Next, as shown in the diagram of the third stage in FIG. 7A and in the diagram of the third stage in FIG. 7B, extraction image data of the extracted cell 5 are subjected to contraction processing. By performing the contraction processing, a crack with a narrow width in a partition wall 4 is contracted, the crack disappears, and the partition wall 4 is closed. Accordingly, as shown in the diagram of the third stage in FIG. 7B, the cell 5 having an area larger than the area of one normal cell is divided by the partition wall 4 to each of the normal cells. On the other hand, as shown in the diagram of the third stage in FIG. 7A, a partition wall 4 having a crack with a wide width or chipping is not closed even if the contraction processing is performed, and the cell 5 having an area larger than the area of one normal cell remains as it is. In this way, the extraction image data are subjected to contraction processing, and the presence or absence of a crack with a narrow width in a partition wall 4 can be detected according to whether or not there are multiple cells 5 divided by partition walls 4 in the extraction image data. In addition, it cannot be determined from the first binary image data whether the break with a wide width in a partition wall 4 at an end face 2 is due to chipping or a crack. For this reason, as shown in the diagram of the fourth stage in FIG. 7A, it is preferred not to detect a crack with a wide width in a partition wall 4 at an end face 2 from the first binary image data.

Processing of Second Image Data for Processing

Second image data for processing are acquired for detecting a crack with a wide width in a partition wall 4 after or before, or at the same time when acquiring the first image data for processing. As shown in FIG. 1C, the honeycomb structure 1 is arranged on a table 14 using a second end face 2b as a placement face 3. Further, second image data for processing at a first end face 2a of a honeycomb structure 1 are acquired while irradiating the first end face 2a with light 12 having an angle k of less than 40°, the angle k being an angle formed between the light 12 and an axis a being perpendicular to a placement face 3 of the honeycomb structure 1.

The light 12 is emitted from a light source 11 toward a first end face 2a of a honeycomb structure 1. The angle k formed between the light 12 to be emitted and the axis a being perpendicular to a placement face 3 of the honeycomb structure 1 is less than 40°, and is more preferably 10° to 30°. When the angle k is less than 40°, the back of the cell 5 up to deep in the longitudinal direction of the honeycomb structure 1 can be irradiated, and as shown in FIG. 5D and FIG. 5F, chipping and a crack with a wide width can be distinguished from each other when the second image data for processing are photographed. On the other hand, as shown in FIG. 5E, the above process is not suitable for photographing a crack with a narrow width.

Figure 8A:
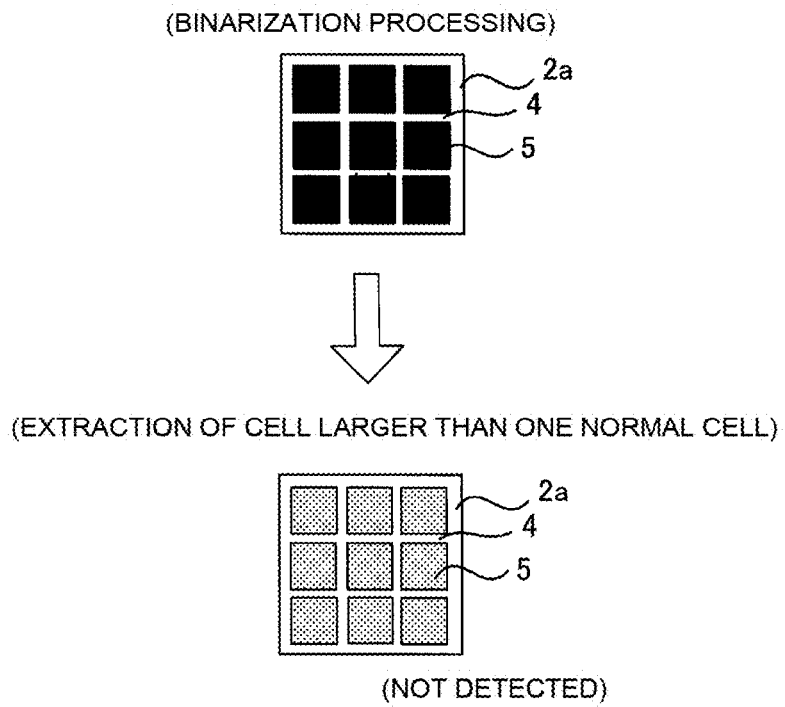
FIG. 8A is an explanatory diagram showing one embodiment of a method for performing image processing by using second image data for processing.
Figure 8B:
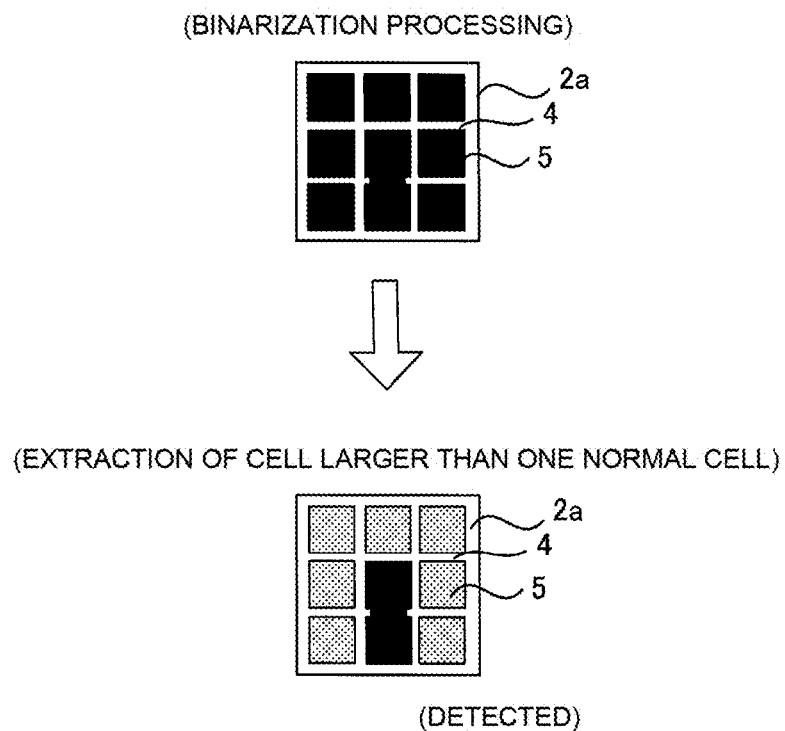
FIG. 8B is an explanatory diagram showing another embodiment of a method for performing image processing by using second image data for processing.

Next, as shown in FIG. 8A and FIG. 8B, a crack with a wide width at the first end face 2a is detected by using the second image data for processing acquired above. In addition, a crack has a crack depth deeper than the depth of chipping in the longitudinal direction of a honeycomb structure 1. For this reason, as shown in FIG. 5F, in the photographing of second image data for processing, a crack with a wide width in a partition wall 4 is photographed in a state that the partition wall 4 is broken. On the other hand, as shown in FIG. 5D, chipping with a wide width in a partition wall 4 has a shallow crack depth. For this reason, by the photographing of second image data for processing, a chip of the partition wall 4 is not photographed, and can be recognized as a partition wall 4 having no crack.

The second image data for processing are subjected to image data processing by a computer, and are used for detecting a crack with a wide width in a partition wall 4. The method for image data processing is not particularly limited, and a known computer image data processing method may be used. For example, a method such as binarization can be mentioned.

FIG. 8A shows a method for image data processing using the second image data for processing in a case where a honeycomb structure 1 has chipping in a partition wall 4. Further, FIG. 8B shows a method for image data processing using the second image data for processing in a case where a honeycomb structure 1 has a crack with a wide width in a partition wall 4. In image data processing using binarization, at first, the second image data for processing are binarized to determine second binary image data. It is preferred that a cell 5 having an area larger than the area of one normal cell is extracted on the basis of the second binary image data, and a crack with a wide width at the end face 2 is detected. Hereinafter, the image data processing method will be described in more detail.

As shown in the diagram of the first stage in FIG. 8A and in the diagram of the first stage in FIG. 8B, when the second image data for processing are binarized to determine second binary image data, a point where the partition wall 4 is broken due to a crack with a wide width and is not photographed in the second image data for processing of the binary image data shows the same color as that of a cell 5. In this way, a cell 5 having the broken partition wall 4 is connected to the adjacent cell 5, and is observed as a cell 5 having an area larger than the area of one normal cell. Further, as shown in the diagram of the second stage in FIG. 8B, a cell 5 having an area larger than the area of one normal cell is extracted in such the second binary image data. On the other hand, as shown in the diagram of the second stage in FIG. 8A, as to the chipping with a wide width at the end face 2 of a honeycomb structure 1, a cell 5 having an area larger than the area of one normal cell is not observed, therefore, the chipping is not detected. Accordingly, only a crack with a wide width can be detected, and excessive detection of chipping can be prevented.

Note that in the above method for inspecting an end face, inspection at a first end face 2a of a honeycomb structure 1 has been described, and the inspection may be performed in a similar way at a second end face 2b.

Examples

Hereinafter, the present invention will be described in more detail by way of Examples, however, the present invention is not limited to the following Examples.

Preparation of Honeycomb Structure

At first, a honeycomb structure 1 for photography was prepared as follows. The raw materials were mixed at a predetermined ratio, water was added to the resultant mixture, and the mixture was kneaded to prepare a kneaded clay. The prepared kneaded clay was vacuum degassed, and then the resultant kneaded clay was subjected to extrusion forming to obtain a honeycomb formed body. Next, the honeycomb formed body was fired to obtain a honeycomb fired body (porous substrate).

The obtained honeycomb structure 1 had a round pillar shape with a bottom diameter of 100 mm and a length of 100 mm in the axis direction, and the thickness of a partition wall was 80 μm, the cell density was 600 cells/square inch (cpsi) (=93 cells/cm$^2$). Further, regarding the obtained honeycomb structure 1, cells 5 were extended in the axis direction 9 of a honeycomb structure 1, and both end faces were formed in a direction perpendicular to the central axis. Moreover, in the cross section in a direction perpendicular to the extending direction of cells 5, the cell shape was a square shape.

Using a device for inspecting an end face 10 as shown in FIG. 1B, and FIG. 1C, an end face 2 of a honeycomb structure 1 was photographed. As shown in FIG. 1B, and FIG. 1C a photographing device 13 was arranged such that the axis a in a direction perpendicular to a placement face 3 of a honeycomb structure 1 is matched with the optical axis of the photographing device 13, and the end face 2 of a honeycomb structure 1 was photographed by changing an angle k of illumination (light source 11) from the axis a, that is, from the optical axis. By setting the angle k formed between the light 12 to be emitted and the axis a being perpendicular to a placement face 3 (second end face 2b) of the honeycomb structure 1 to 70°, 50°, 30°, and 10°, the photographing was performed. As the photographing device 13, a line sensor camera (trade name: ES-80-08K80, manufactured by DALSA Inc.) was used, and as the light source 11 (illumination), line illumination (trade name: LNSP-200SW, manufactured by CCS Inc.) was used. Further, the photographing device 13 was connected to an image data processing device. As the image data processing device, a personal computer and commercially available image data processing software were used.

From the image data for processing, a crack with a narrow width (detection points A1 to A3), chipping (detection points B1 to B3), and a crack with a wide width (detection points C1 to C3) were selected. The width of each of the cracks and the depth of each of the chippings are shown in Tables 1 to 3. Further, image data for processing of a detection point A1 are shown in FIG. 9, image data for processing of a detection point B1 are shown in FIG. 10, and image data for processing of a detection point C1 are shown in FIG. 11.

Detection of Crack with Narrow Width in Partition Wall

Next, image data analysis was performed on image data of a crack with a narrow width (detection points A1 to A3). In a case where the angle k of illumination (light source 11) from the optical axis was 40° or more, image data for processing were subjected to binarization processing by a computer as shown in FIG. 7A and FIG. 7B, and subsequently, a cell 5 having an area larger than the area of one normal cell is extracted in the binary image data, and the extraction image data of the extracted cell 5 were subjected to contraction processing. The presence or absence of a crack with a width of less than 100 μm in a partition wall 4 was detected according to whether or not there are multiple cells 5 divided by partition walls 4 in the extraction image data. In a case where the angle k was less than 40°, the image data for processing were subjected to binarization processing by a computer according to FIG. 8A and FIG. 8B, and subsequently, a cell 5 having an area larger than the area of one normal cell is extracted in the binary image data, and the presence or absence of a crack was detected.

As a result of the image data analysis, whether a region including the detection point was extracted as a cell 5 having an area larger than the area of one normal cell, or whether the detection point was detected as a crack, in the binary image data, is shown in Table 1. A case of being extracted as a cell 5 having an area larger than the area of one normal cell is expressed as A, and a case of not being extracted as a cell 5 having an area larger than the area of one normal cell is expressed as B, and as a result, a case of being detected as a crack is expressed as C, and a case of not being detected as a crack is expressed as D. Note that the width of the cracks described in Table was measured with an optical microscope.

TABLE 1

|  |  | Width of a crack | Angle of illumination from optical axis ||||
| --- | --- | --- | --- | --- | --- | --- |
|  |  |  | 70° | 50° | 30° | 10° |
| Whether being extracted as a cell having an area larger than the area of one normal cell or not | Detection point A1 | 24 μm | A | B | B | B |
|  | Detection point A2 | 24 μm | A | A | B | B |
|  | Detection point A3 | 26 μm | A | A | A | B |
| Whether being detected as a crack or not | Detection point A1 | 24 μm | C | D | D | D |
|  | Detection point A2 | 24 μm | C | C | D | D |
|  | Detection point A3 | 26 μm | C | C | C | D |

Detection points A1 to A3 of a crack with a narrow width were able to be detected as a crack if the light 12 to be emitted had an angle of 70° from the optical axis.

Detection of Chipping

For also the detection points B1 to B3 having chipping, image data for processing were acquired similarly as for the detection points A1 to A3. In a case where the angle k of illumination (light source 11) from the optical axis was 40° or more, image data for processing were subjected to binarization processing by a computer as shown in FIG. 7A and FIG. 7B, and subsequently, a cell 5 having an area larger than the area of one normal cell is extracted in the binary image data, and the extraction image data of the extracted cell 5 were subjected to contraction processing. The presence or absence of chipping in a partition wall 4 was detected according to whether or not there are multiple cells 5 divided by partition walls 4 in the extraction image data. In a case where the angle k was less than 40°, the image data for processing were subjected to binarization processing by a computer according to FIG. 8A and FIG. 8B, and subsequently, a cell 5 having an area larger than the area of one normal cell was extracted in the binary image data, and the presence or absence of chipping was detected.

In Table 2, a case of being extracted as a cell 5 having an area larger than the area of one normal cell is expressed as A, and a case of not being extracted as a cell 5 having an area larger than the area of one normal cell is expressed as B, and as a result, a case of being detected as a crack is expressed as C, and a case of not being detected as a crack is expressed as D. Note that the depth of chipping described in Table was measured with a vernier caliper.

TABLE 2

| | | Depth of chipping | Angle of illumination from optical axis | | | |
|---|---|---|---|---|---|---|
| | | | 70° | 50° | 30° | 10° |
| Whether being extracted as a cell having an area larger than the area of one normal cell or not | Detection point B1 | 0.2 mm | A | B | B | B |
| | Detection point B2 | 0.3 mm | A | A | B | B |
| | Detection point B3 | 0.5 mm | A | A | B | B |
| Whether being detected as a crack or not | Detection point B1 | 0.2 mm | D | D | D | D |
| | Detection point B2 | 0.3 mm | D | D | D | D |
| | Detection point B3 | 0.5 mm | D | D | D | D |

In detection points B1 to B3 of chipping, even if the light 12 to be emitted had any one of the angles, detection as a crack was not observed.

Detection of Crack with Wide Width in Partition Wall

For also the detection points C1 to C3 having a crack with a wide width, image data for processing were acquired similarly as for the detection points A1 to A3. In a case where the angle k was 40° or more, image data for processing were subjected to binarization processing by a computer as shown in FIG. 7A and FIG. 7B, and subsequently, a cell 5 having an area larger than the area of one normal cell is extracted in the binary image data, and the extraction image data of the extracted cell 5 were subjected to contraction processing. The presence or absence of a crack with a width of 100 μm or more was detected according to whether or not there are multiple cells 5 divided by partition walls 4 in the extraction image data. In a case where the angle k was less than 40°, the image data for processing were subjected to binarization processing by a computer according to FIG. 8A and FIG. 8B, and subsequently, a cell 5 having an area larger than the area of one normal cell is extracted in the binary image data, and the presence or absence of a crack was detected.

In Table 3, a case of being extracted as a cell 5 having an area larger than the area of one normal cell is expressed as A, and a case of not being extracted as a cell 5 having an area larger than the area of one normal cell is expressed as B, and as a result, a case of being detected as a crack is expressed as C, and a case of not being detected as a crack is expressed as D. Note that the width of the cracks described in Table was measured with an optical microscope.

TABLE 3

| | | Width of a crack | Angle of illumination from optical axis | | | |
|---|---|---|---|---|---|---|
| | | | 70° | 50° | 30° | 10° |
| Whether being extracted as a cell having an area larger than the area of one normal cell or not | Detection point C1 | 100 μm | A | A | A | A |
| | Detection point C2 | 120 μm | A | A | A | A |
| | Detection point C3 | 2.4 mm | A | A | A | A |
| Whether being detected as a crack or not | Detection point C1 | 100 μm | D | D | C | C |
| | Detection point C2 | 120 μm | D | D | C | C |
| | Detection point C3 | 2.4 mm | D | D | C | C |

Detection points C1 to C3 of a crack with a wide width were able to be detected in distinction from chipping in a case where the angle of the light 12 to be emitted from the optical axis was less than 40°.

As shown in Tables 1 to 3, by subjecting the image data for processing in which the irradiation direction of the light 12 had been changed to image data processing, chipping, a crack with a narrow width, and a crack with a wide width were able to be distinguished from one another.

INDUSTRIAL APPLICABILITY

A method for inspecting an end face of a honeycomb structure, and a device for inspecting an end face of a honeycomb structure, according to the present invention are suitably used in a process of sorting a good product and a defective product for a prepared honeycomb structure.

DESCRIPTION OF REFERENCE NUMERALS

1: honeycomb structure, 2: end face, 2a: first end face, 2b: second end face, 3: placement face, 4: partition wall, 4a: wall thickness, 5: cell, 9: axis direction, 10: device for inspecting an end face, 11: light source, 11a: first light source, 11b: second light source, 12: light (to be emitted), 13: photographing device, 13a: first photographing device, 13b: second photographing device, 14: table, 15: mirror, 21: first image data for processing acquisition unit, 22: second image data for processing acquisition unit, 23: arrangement unit, 26: first position, 27: second position, 28: reversing device, a: axis in a direction perpendicular to a placement face of a honeycomb structure, and k: angle.

The invention claimed is:

1. A method for inspecting an end face, comprising:
an arrangement step of arranging a honeycomb structure having a porous partition wall defining and forming a plurality of cells and extending from a first end face to a second end face, at a predetermined position using the second end face as a placement face;
a first image data for processing acquisition step of acquiring first image data for processing at the first end face of the honeycomb structure while irradiating the first end face with light having an angle of 40° or more, the angle being an angle formed between the light and an axis being perpendicular to the placement face of the honeycomb structure;
a second image data for processing acquisition step of acquiring second image data for processing at the first end face of the honeycomb structure while irradiating the first end face with light having an angle of less than 40°, the angle being an angle formed between the light and an axis being perpendicular to the placement face of the honeycomb structure;
a crack detection step of detecting only a crack in the partition wall by distinguishing a crack with a width narrower than a predetermined width, and a crack with a width wider than the predetermined width or chipping from each other by the first image data for processing, and distinguishing the crack with the width wider than the predetermined width and the chipping from each other by the second image data for processing; and
wherein in the crack detection step, the second image data for processing are binarized to determine second binary image data, a cell having an area larger than an area of one normal cell is extracted on the basis of the second binary image data, and a crack at the first end face is detected.

2. The method for inspecting an end face according to claim 1, wherein
the second image data for processing are acquired after or before acquiring the first image data for processing.

3. The method for inspecting an end face according to claim 1, wherein
the light having an angle of 40° or more and the light having an angle of less than 40°, the angle being an angle formed between the light and an axis being perpendicular to the placement face of the honeycomb structure, are lights each having a wavelength different from each other, and using the lights each having a wavelength different from each other, the first image data for processing and the second image data for processing are acquired at the same time.

4. The method for inspecting an end face according to claim 1, wherein
in the crack detection step, the first image data for processing are binarized to determine first binary image data, a width of a defective portion in the partition wall is determined in the first binary image data, and presence or absence of a crack in the partition wall is detected by comparing the width with a predetermined threshold value.

5. A method for inspecting an end face, comprising:
an arrangement step of arranging a honeycomb structure having a porous partition wall defining and forming a plurality of cells and extending from a first end face to a second end face, at a predetermined position using the second end face as a placement face;
a first image data for processing acquisition step of acquiring first image data for processing at the first end face of the honeycomb structure while irradiating the first end face with light having an angle of 40° or more, the angle being an angle formed between the light and an axis being perpendicular to the placement face of the honeycomb structure;
a second image data for processing acquisition step of acquiring second image data for processing at the first end face of the honeycomb structure while irradiating the first end face with light having an angle of less than 40°, the angle being an angle formed between the light and an axis being perpendicular to the placement face of the honeycomb structure;
a crack detection step of detecting only a crack in the partition wall by distinguishing a crack with a width narrower than a predetermined width, and a crack with a width wider than the predetermined width or chipping from each other by the first image data for processing, and distinguishing the crack with the width wider than the predetermined width and the chipping from each other by the second image data for processing; and
wherein in the crack detection step, the first image data for processing are binarized to determine first binary image data, a cell having an area larger than an area of one normal cell is extracted in the first binary image data, and extraction image data of the extracted cell are subjected to contraction processing to detect presence or absence of a crack in the partition wall.

6. The method for inspecting an end face according to claim 5, wherein
the second image data for processing are acquired after or before acquiring the first image data for processing.

7. The method for inspecting an end face according to claim 5, wherein
the light having an angle of 40° or more and the light having an angle of less than 40°, the angle being an angle formed between the light and an axis being perpendicular to the placement face of the honeycomb structure, are lights each having a wavelength different from each other, and using the lights each having a wavelength different from each other, the first image data for processing and the second image data for processing are acquired at the same time.

* * * * *